US012574890B2

(12) United States Patent
Ashraf et al.

(10) Patent No.: US 12,574,890 B2
(45) Date of Patent: Mar. 10, 2026

(54) METHOD AND APPARATUS FOR POSITIONING USING SIDELINK INFORMATION

(71) Applicant: Nokia Technologies Oy, Espoo (FI)

(72) Inventors: Muhammad Ikram Ashraf, Espoo (FI); Taylan Sahin, Munich (DE); Mikko Säily, Espoo (FI); Ryan Keating, Naperville, IL (US); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 323 days.

(21) Appl. No.: 18/333,239

(22) Filed: Jun. 12, 2023

(65) Prior Publication Data

US 2023/0413219 A1      Dec. 21, 2023

(30) Foreign Application Priority Data

Jun. 20, 2022    (FI) ...................................... 20225548

(51) Int. Cl.
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
CPC ....... H04W 64/00; H04W 92/18; H04W 4/40; H04W 76/14; H04W 76/19; H04W 8/005;
(Continued)

(56) References Cited

U.S. PATENT DOCUMENTS

2016/0095080 A1* 3/2016 Khoryaev ............. G01S 5/0284
455/456.1
2018/0352412 A1* 12/2018 Huang .............. H04W 36/0055
(Continued)

FOREIGN PATENT DOCUMENTS

WO      2017/023474 A1      2/2017
WO      2021/144026 A1      7/2021
(Continued)

OTHER PUBLICATIONS

Extended European Search Report received for corresponding European Patent Application No. 23178812.6, dated Nov. 17, 2023, 11 pages.
(Continued)

*Primary Examiner* — Nimesh Patel
(74) *Attorney, Agent, or Firm* — Lippes Mathias LLP

(57) ABSTRACT

Disclosed is a method comprising determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

20 Claims, 8 Drawing Sheets

(58) Field of Classification Search

CPC ..... H04W 88/04; H04W 76/23; H04W 72/02; H04W 52/0229; H04W 52/0245; H04W 72/54; H04W 28/0268; H04W 72/20; H04W 28/0236; H04W 28/0967; H04W 48/10; H04W 84/042; H04W 4/023; H04W 72/04; H04W 36/302; H04W 56/002; H04W 72/563; H04W 76/10; H04W 36/18; H04W 36/00833; H04W 36/144; H04W 36/03; H04W 72/00; H04W 88/14; G01S 2205/01; G01S 5/0072; G01S 5/0236; G01S 5/0289; G01S 5/0009; G01S 1/042; H04L 1/1812; H04L 2001/0097; H04L 5/0007; H04L 41/0803; H04L 43/08; H04L 5/006; H04L 5/0037; H04J 11/0079; H04J 11/0056; H04J 11/0026; H04J 11/00; H04J 11/0059; H04J 11/0069; H04J 11/0023; H04J 2011/0096; H04B 7/0695; H04B 7/0452; H04B 7/0626; H04B 7/0617; H04B 17/318; H04B 17/336; H04B 7/06954; H04B 17/327; H04B 7/15507; H04B 17/382; H04B 17/346; H04B 17/328; H04B 17/3913

See application file for complete search history.

(56) References Cited

U.S. PATENT DOCUMENTS

| | | | |
|---|---|---|---|
| 2021/0297206 A1 | 9/2021 | Manolakos et al. | |
| 2022/0287128 A1* | 9/2022 | Shin ..................... | H04W 8/005 |
| 2023/0199802 A1* | 6/2023 | Ganesan ............... | H04W 72/25 |
| | | | 370/329 |
| 2023/0269812 A1* | 8/2023 | Hahn .................... | H04W 76/19 |
| | | | 370/329 |

FOREIGN PATENT DOCUMENTS

| | | | |
|---|---|---|---|
| WO | 2021/240478 A1 | 12/2021 | |
| WO | 2022/113873 A1 | 6/2022 | |

OTHER PUBLICATIONS

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.7.0, Dec. 2021, pp. 1-121.

"3rd Generation Partnership Project; Technical Specification Group Radio Access Network; Study on scenarios and requirements of in-coverage, partial coverage, and out-of coverage NR positioning use cases (Release 17)", 3GPP TR 38.845, V17.0.0, Sep. 2021, pp. 1-16.

"3rd Generation Partnership Project; Technical Specification Group Services and System Aspects; Service requirements for the 5G system; Stage 1 (Release 18)", 3GPP TS 22.261, V18.5.0, Dec. 2021, 115 pages.

"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-105.

"3rd Generation Partnership Project; Technical Specification Group Radio Access Network; Overall description of Radio Access Network (RAN) aspects for Vehicle-to-everything (V2X) based on LTE and NR (Release 16)", 3GPP TR 37.985, V16.0.0, Jun. 2020, pp. 1-35.

"New WID on NR Positioning Enhancements", 3GPP TSG RAN Meeting #94e, RP-212706, Agenda: 8A.1, Intel, Dec. 6-17, 2021, 5 pages.

"System Architecture and Solution Development; High-Accuracy Positioning for C-V2X", 5GAA, Technical Report, Version 1.0, Feb. 9, 2021, pp. 1-55.

"3rd Generation Partnership Project; Technical Specification Group Radio Access Network; LTE Positioning Protocol (LPP) (Release 16)", 3GPP TS 37.355, V16.7.0, Dec. 2021, pp. 1-299.

"Msc-generator", Sourceforge, Retrieved on Jun. 16, 2023, Webpage available at : https://sourceforge.net/projects/msc-generator/.

"Moderator's summary for [RAN94e-R18Prep-06] on Expanded and improved positioning", 3GPP TSG-RAN Meeting #94e, RP-212666, Agenda: 8A.1, Intel, Dec. 6-17, 2021, pp. 1-87.

Office action received for corresponding Finnish U.S. Appl. No. 20/225,548, dated Nov. 24, 2022, 8 pages. .

"KI#5, New solution: Network assisted sidelink positioning for partial coverage", 3GPP TSG-SA WG2#151E e-meeting, S2-2204678, Agenda: 9.20, Xiaomi, May 16-20, 2022, 4 pages.

* cited by examiner

In-coverage scenario

Partial or out-of-coverage scenario

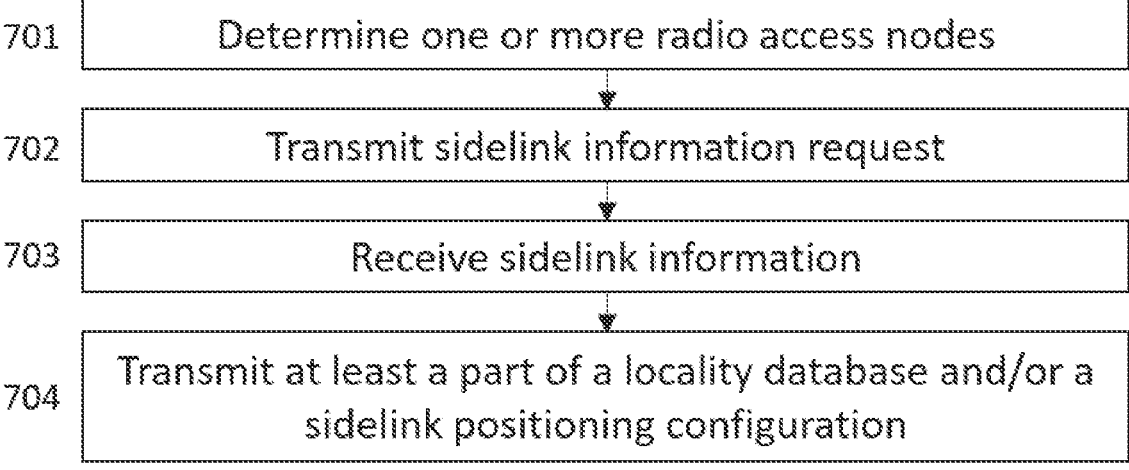

701 | Determine one or more radio access nodes

702 | Transmit sidelink information request

703 | Receive sidelink information

704 | Transmit at least a part of a locality database and/or a sidelink positioning configuration

FIG. 7

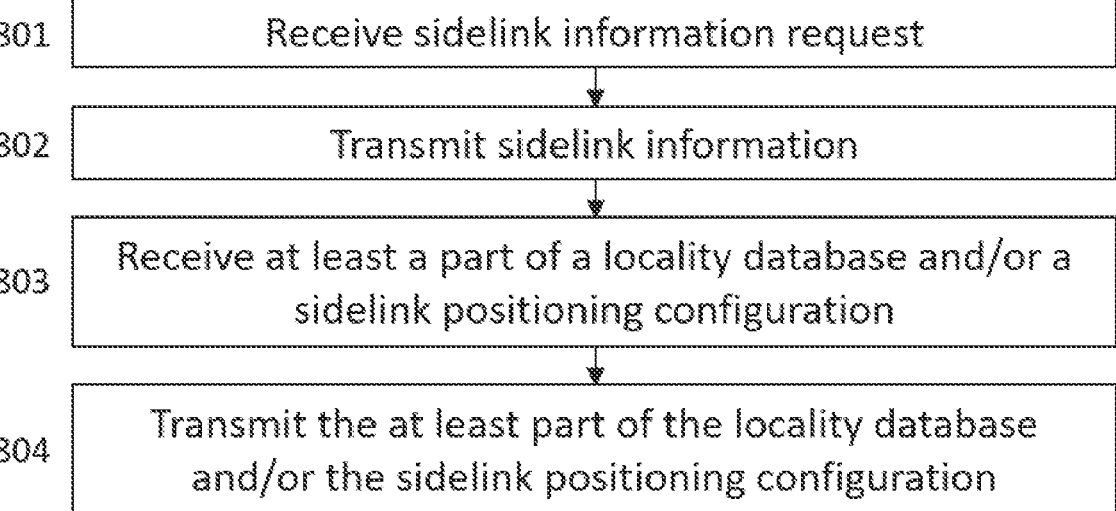

801 | Receive sidelink information request

802 | Transmit sidelink information

803 | Receive at least a part of a locality database and/or a sidelink positioning configuration 804 | Transmit the at least part of the locality database and/or the sidelink positioning configuration

METHOD AND APPARATUS FOR POSITIONING USING SIDELINK INFORMATION

TECHNICAL FIELD

The following example embodiments relate to wireless communication, in particular to positioning.

BACKGROUND

Positioning technologies may be used to estimate a physical location of a user device. There is a challenge in how to position a user device that is out of coverage.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory including computer program code, wherein the at least one memory and the computer program code are configured, with the at least one processor, to cause the apparatus to: determine one or more radio access nodes based on available location information of a target user device and at least one neighboring user device of the target user device; transmit a sidelink information request to the one or more radio access nodes, wherein the sidelink information request indicates requesting sidelink information of the target user device and the at least one neighboring user device of the target user device; receive the sidelink information from the one or more radio access nodes; and transmit, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided an apparatus comprising at least one processor and at least one transceiver, wherein the at least one processor is configured to: determine one or more radio access nodes based on available location information of a target user device and at least one neighboring user device of the target user device; wherein the at least one transceiver is configured to: transmit a sidelink information request to the one or more radio access nodes, wherein the sidelink information request indicates requesting sidelink information of the target user device and the at least one neighboring user device of the target user device; receive the sidelink information from the one or more radio access nodes; and transmit, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided an apparatus comprising means for: determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided a method comprising: determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided a computer program comprising instructions which, when executed by an apparatus, cause the apparatus to perform at least the following: determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided a computer program comprising instructions for causing an apparatus to perform at least the following: determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided a computer readable medium comprising program instructions for causing an apparatus to perform at least the following: determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided a non-transitory computer readable medium comprising program instructions for causing an apparatus to perform at least the following: determining one or more radio access nodes based on available location information of a target user device and at least one neighboring user device of the target user device; transmitting a sidelink information request to the one or more radio access nodes, wherein the sidelink information request indicates requesting sidelink information of the target user device and the at least one neighboring user device of the target user device; receiving the sidelink information from the one or more radio access nodes; and transmitting, to at least one of the one or more radio access nodes and/or the at least one neighboring user device, at least a part of a locality database and/or a sidelink positioning configuration for positioning the target user device, wherein the locality database and/or the sidelink positioning configuration are based at least on the sidelink information.

According to another aspect, there is provided an apparatus comprising at least one processor, and at least one memory including computer program code, wherein the at least one memory and the computer program code are configured, with the at least one processor, to cause the apparatus to: receive a sidelink information request from a positioning entity, wherein the sidelink information request indicates requesting sidelink information of a target user device and at least one neighboring user device of the target user device; transmit the sidelink information to the positioning entity; receive, from the positioning entity, at least a part of a locality database and/or a sidelink positioning configuration for positioning the target user device, wherein the locality database and/or the sidelink positioning configuration are based at least on the sidelink information; and transmit, to the at least one neighboring user device, the at least part of the locality database and/or the sidelink positioning configuration.

According to another aspect, there is provided an apparatus comprising at least one transceiver, wherein the at least one transceiver is configured to: receive a sidelink information request from a positioning entity, wherein the sidelink information request indicates requesting sidelink information of a target user device and at least one neighboring user device of the target user device; transmit the sidelink information to the positioning entity; receive, from the positioning entity, at least a part of a locality database and/or a sidelink positioning configuration for positioning the target user device, wherein the locality database and/or the sidelink positioning configuration are based at least on the sidelink information; and transmit, to the at least one neighboring user device, the at least part of the locality database and/or the sidelink positioning configuration.

According to another aspect, there is provided an apparatus comprising means for: receiving a sidelink information request from a positioning entity, wherein the sidelink information request indicates requesting sidelink information of a target user device and at least one neighboring user device of the target user device; transmitting the sidelink information to the positioning entity; receiving, from the positioning entity, at least a part of a locality database and/or a sidelink positioning configuration for positioning the target user device, wherein the locality database and/or the sidelink positioning configuration are based at least on the sidelink information; and transmitting, to the at least one neighboring user device, the at least part of the locality database and/or the sidelink positioning configuration.

According to another aspect, there is provided a method comprising: receiving a sidelink information request from a positioning entity, wherein the sidelink information request indicates requesting sidelink information of a target user device and at least one neighboring user device of the target user device; transmitting the sidelink information to the positioning entity; receiving, from the positioning entity, at least a part of a locality database and/or a sidelink positioning configuration for positioning the target user device, wherein the locality database and/or the sidelink positioning configuration are based at least on the sidelink information; and transmitting, to the at least one neighboring user device, the at least part of the locality database and/or the sidelink positioning configuration.

According to another aspect, there is provided a computer program comprising instructions which, when executed by an apparatus, cause the apparatus to perform at least the following: receiving a sidelink information request from a positioning entity, wherein the sidelink information request indicates requesting sidelink information of a target user device and at least one neighboring user device of the target user device; transmitting the sidelink information to the positioning entity; receiving, from the positioning entity, at least a part of a locality database and/or a sidelink positioning configuration for positioning the target user device, wherein the locality database and/or the sidelink positioning configuration are based at least on the sidelink information; and transmitting, to the at least one neighboring user device, the at least part of the locality database and/or the sidelink positioning configuration.

According to another aspect, there is provided a computer program comprising instructions for causing an apparatus to perform at least the following: receiving a sidelink information request from a positioning entity, wherein the sidelink information request indicates requesting sidelink information of a target user device and at least one neighboring user device of the target user device; transmitting the sidelink information to the positioning entity; receiving, from the positioning entity, at least a part of a locality database and/or a sidelink positioning configuration for positioning the target user device, wherein the locality database and/or the sidelink positioning configuration are based at least on the sidelink information; and transmitting, to the at least one neighboring user device, the at least part of the locality database and/or the sidelink positioning configuration.

According to another aspect, there is provided a computer readable medium comprising program instructions for causing an apparatus to perform at least the following: receiving a sidelink information request from a positioning entity, wherein the sidelink information request indicates requesting sidelink information of a target user device and at least one neighboring user device of the target user device; transmitting the sidelink information to the positioning entity; receiving, from the positioning entity, at least a part of a locality database and/or a sidelink positioning configuration for positioning the target user device, wherein the locality database and/or the sidelink positioning configuration are based at least on the sidelink information; and transmitting, to the at least one neighboring user device, the at least part of the locality database and/or the sidelink positioning configuration.

According to another aspect, there is provided a non-transitory computer readable medium comprising program instructions for causing an apparatus to perform at least the following: receiving a sidelink information request from a positioning entity, wherein the sidelink information request indicates requesting sidelink information of a target user device and at least one neighboring user device of the target user device; transmitting the sidelink information to the positioning entity; receiving, from the positioning entity, at least a part of a locality database and/or a sidelink positioning configuration for positioning the target user device, wherein the locality database and/or the sidelink positioning configuration are based at least on the sidelink information; and transmitting, to the at least one neighboring user device, the at least part of the locality database and/or the sidelink positioning configuration.

LIST OF DRAWINGS

In the following, various example embodiments will be described in greater detail with reference to the accompanying drawings, in which FIG. 1 illustrates an example embodiment of a cellular communication network;

FIG. 7 illustrates a flow chart according to an example embodiment;

FIG. 8 illustrates a flow chart according to an example embodiment;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), or beyond 5G, without restricting the example embodiments to such an architecture.

However, it is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
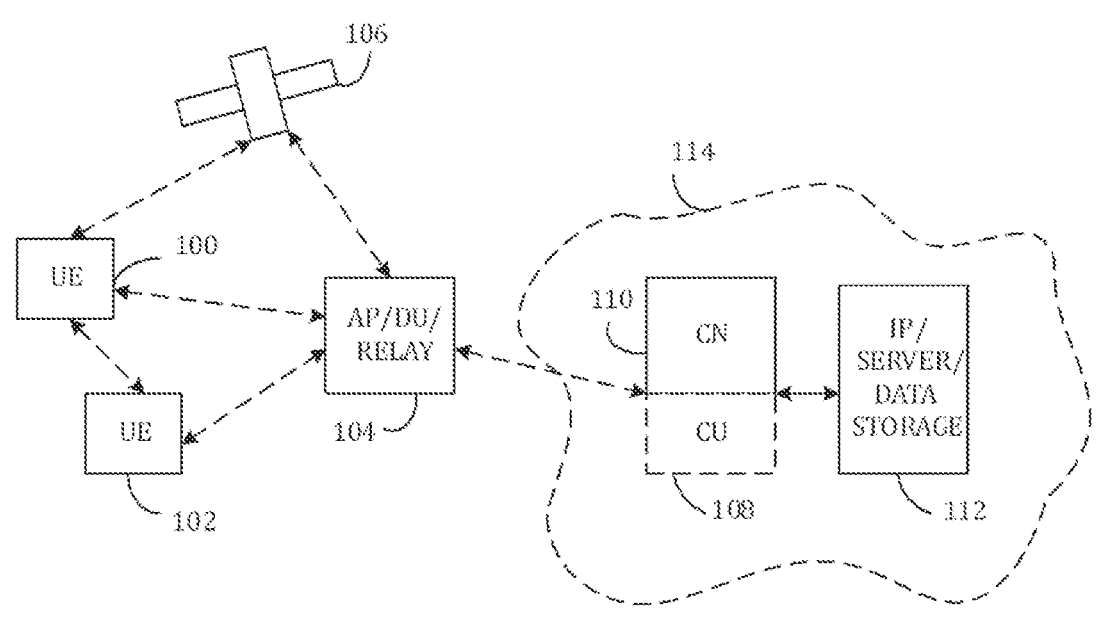

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104, such as an evolved Node B (abbreviated as eNB or eNodeB) or a next generation Node B (abbreviated as gNB or gNodeB), providing the cell. The physical link from a user device to an access node may be called uplink or reverse link, and the physical link from the access node to the user device may be called downlink or forward link. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes. The access node may be a computing device configured to control the radio resources of communication system it is coupled to.

The access node may also be referred to as a base station, an access point or any other type of interfacing device including a relay station capable of operating in a wireless environment. The access node may include or be coupled to transceivers. From the transceivers of the access node, a connection may be provided to an antenna unit that establishes bi-directional radio links to user devices.

The antenna unit may comprise a plurality of antennas or antenna elements. The access node may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices to external packet data networks, mobility management entity (MME), access and mobility management function (AMF), or location management function (LMF), etc.

The user device illustrates one type of an apparatus to which resources on the air interface may be allocated and assigned, and thus any feature described herein with a user device may be implemented with a corresponding apparatus, such as a relay node. The user device may also be called a subscriber unit, mobile station, remote terminal, access terminal, user terminal, terminal device, or user equipment (UE) just to mention but a few names or apparatuses.

An example of such a relay node may be relay (self-backhauling relay) based on layer 3 or layer 2 towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

An example of such a relay node may be a relay based on layer 1 called a repeater. The repeater may amplify the signal received from a base station or user device to the user device or base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, or any devices integrated in a vehicle.

It should be appreciated that a user device may also be a nearly exclusive uplink only device, of which an example may be a camera or video camera loading images or video clips to a network.

A user device may also be a device having capability to operate in Internet of Things (IoT) network which is a scenario in which objects may be provided with the ability to transfer data over a network without requiring human-to-human or human-to-computer interaction. The user device may also utilize cloud.

In some applications, a user device may comprise a small portable device with radio parts (such as a watch, earphones or eyeglasses) and the computation may be carried out in the cloud. The user device (or in some example embodiments a layer 3 relay node) may be configured to perform one or more of user equipment functionalities. The user device may also comprise, or be comprised in, a robot or a vehicle such as a train or a car.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

Radio network, e.g., fifth generation of cellular networks (5G), enables using multiple-input and multiple-output (MIMO) antennas, many more base stations or nodes than the LTE (a so-called small cell concept), including macro sites operating in co-operation with smaller stations and employing a variety of radio technologies depending on service needs, use cases and/or spectrum available.

Mobile communications, e.g., 5G system (5GS) may support a wide range of use cases and related applications including video streaming, augmented reality, different ways of data sharing and various forms of machine type applications (such as (massive) machine-type communications (mMTC), including vehicular safety, different sensors and real-time control.

5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave).

One of the concepts considered to be used in 5G networks may be network slicing in which multiple independent and dedicated virtual sub-networks (network instances) may be created within the substantially same infrastructure to run services that have different requirements on latency, reliability, throughput and mobility.

The architecture in LTE networks may be fully distributed in the radio and fully centralized in the core network. The low latency applications and services in 5G may need to bring the content close to the radio which leads to local break out and multi-access edge computing (MEC).

5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time.

Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud RAN architecture.

It should also be understood that the distribution between core network operations and base station operations may differ from that of the LTE or even be non-existent. Some other technology advancements that may be used includes big data and all-IP, which may change the way networks are being constructed and managed. 5G (or new radio, NR) networks may be designed to support multiple hierarchies, where MEC servers may be placed between the core and the base station or access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of access nodes, the user device may have an access to a plurality of radio cells and the system may also comprise other apparatuses, such as physical layer relay nodes or other network elements, etc. At least one of the access nodes may be a Home eNodeB or a Home gNodeB.

Furthermore, the access node may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the access node. The DU may be defined as a logical node hosting radio link control (RLC), medium access control (MAC) and/or physical (PHY) layers of the access node.

The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform.

Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of cells. In multilayer networks, one access node may provide one kind of a cell or cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeB(s) or Home gNodeB(s), a Home NodeB gateway, or HNB-GW (not shown in FIG. 1). An HNB-GW, which may be installed within an operator's network, may aggregate traffic from a large number of Home eNodeBs or Home gNodeBs back to a core network.

Positioning technologies may be used to estimate a physical location of a user device. Herein the user device to be positioned is referred to as a target user device. For example, the following positioning techniques may be used in NR: downlink time difference of arrival (DL-TDoA), uplink time difference of arrival (UL-TDoA), downlink angle of departure (DL-AoD), uplink angle of arrival (UL-AoA), and/or multi-cell round trip time (multi-RTT).

In wireless positioning, multiple positioning anchors in known locations may transmit and/or receive one or more positioning reference signals (PRS) to/from the target user device. For example, multilateration techniques may then be used to localize (i.e., position) the target user device with respect to the positioning anchors. The positioning anchors may also be referred to as anchors, multilateration anchors, or reference points herein. The positioning anchors may be, for example, radio access nodes (in uplink/downlink positioning) or other user devices (in sidelink positioning).

In sidelink (SL) positioning, the target user device may be positioned by transmitting one or more sidelink positioning reference signals (SL PRS) from the target user device to one or more anchor user devices, and/or by transmitting one or more SL PRS from the one or more anchor user devices to the target user device. Herein the one or more anchor user devices refer to other user devices acting as positioning anchors for supporting the positioning of the target user device.

One of the advantages of sidelink positioning comes into play, when the target user device needs to be positioned outside the network coverage, or in scenarios having a limited number of radio access nodes or transmission-and-reception points (TRPs) used as positioning anchors. Namely, sidelink positioning can be considered as a solution to improve the availability of positioning, for example, when Uu positioning is not available (e.g., the target user device is out of coverage), and when global navigation satellite system (GNSS) signals are not available (e.g., in places like tunnels, heavy urban scenarios, etc.).

With sidelink positioning, the target user device can make use of other user devices (or e.g., road-side units with SL interface), which serve as positioning anchors over SL. With the aid of SL, the target user device can be positioned under limited coverage or out-of-coverage scenarios.

Three network coverage scenarios (in coverage, partial coverage, and out of coverage) may be considered when at least two user devices are involved in positioning for example for vehicle-to-everything (V2X) or public safety use cases. Taking the case of two user devices as an example, the in-coverage scenario refers to the case where both user devices are inside the network. Partial coverage means that one user device remains inside the network coverage, but the other user device is outside the network coverage. The out-of-coverage scenario refers to the case where both user devices are outside the network coverage. A user device may transit between in-coverage, partial coverage and out-of-coverage scenarios. There may be V2X and public safety use cases that may require positioning, when there is no network and no GNSS coverage.

Figure 2A:
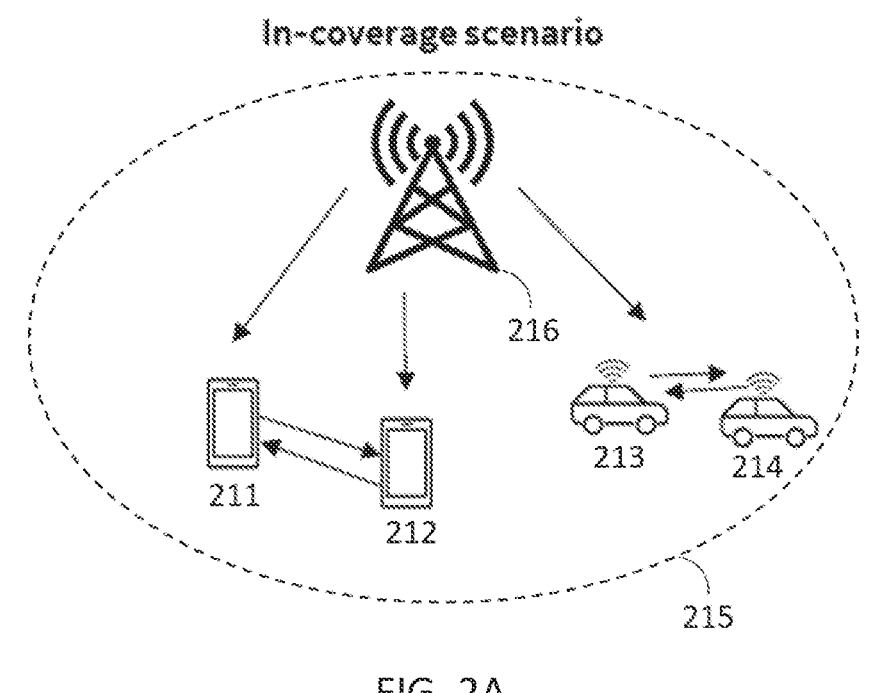
FIG. 2A illustrates an in-coverage scenario.

FIG. 2A illustrates an example of an in-coverage scenario, wherein the user devices 211, 212, 213, 214 are inside the coverage of the radio cell 215 provided by the radio access node 216.

Figure 2B:
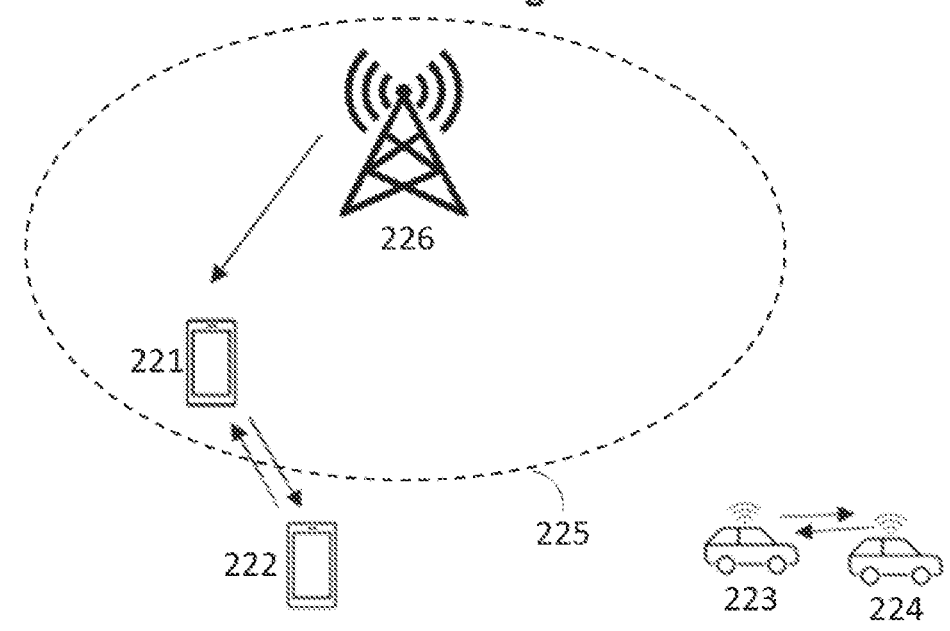
FIG. 2B illustrates a partial coverage or out-of-coverage scenario.

FIG. 2B illustrates a partial coverage or out-of-coverage scenario, wherein at least some of the user devices 222, 223, 224 are out-of-coverage of the radio cell 225 provided by the radio access node 226. Partial coverage means that at least one user device 221 is in-coverage of the radio access node 226, while other user devices 222, 223, 224 are out-of-coverage. The in-coverage user device 221 may have a sidelink interface to the out-of-coverage user device 222.

SL PRS may be configured in terms of various parameters including time-frequency resources, such as bandwidth and periodicity; directivity-related parameters such as beam direction, beam width, number of beams, etc.; and transmit power. The configuration of such parameters may be referred to as an SL PRS configuration or sidelink positioning configuration herein.

Under network coverage, the SL PRS configuration may be determined by the network, such as the location management function (LMF) or the gNB in NR. For out-of-coverage operation, the SL PRS configuration may be (pre-)configured. The (pre-)configuration information, which may also be called "assistance data" for positioning, may be provided to user devices by the network.

A resource pool (RP) is a set of resources assigned for SL procedures. There are two types of RPs: reception resource pools (Rx RPs) and transmission resource pools (Tx RPs). These may be either signaled by the gNB for the in-coverage case, or preconfigured for the out-of-coverage case.

To transmit and receive data or control signaling over SL, user devices may utilize one of the following resource allocation modes: NR SL mode 1 (network-controlled mode), or NR SL mode 2 (UE-autonomous mode). In NR SL mode 1, the network allocates the SL resources for user devices. In NR SL mode 2, user devices autonomously select SL resources based on a sensing mechanism.

For NR SL mode 1, the user device needs to be in the RRC_CONNECTED state. For NR SL mode 2, the user device can also be in RRC_INACTIVE or RRC_IDLE state (e.g., when out of coverage), in addition to the possibility of operating in RRC_CONNECTED state.

Figure 3:
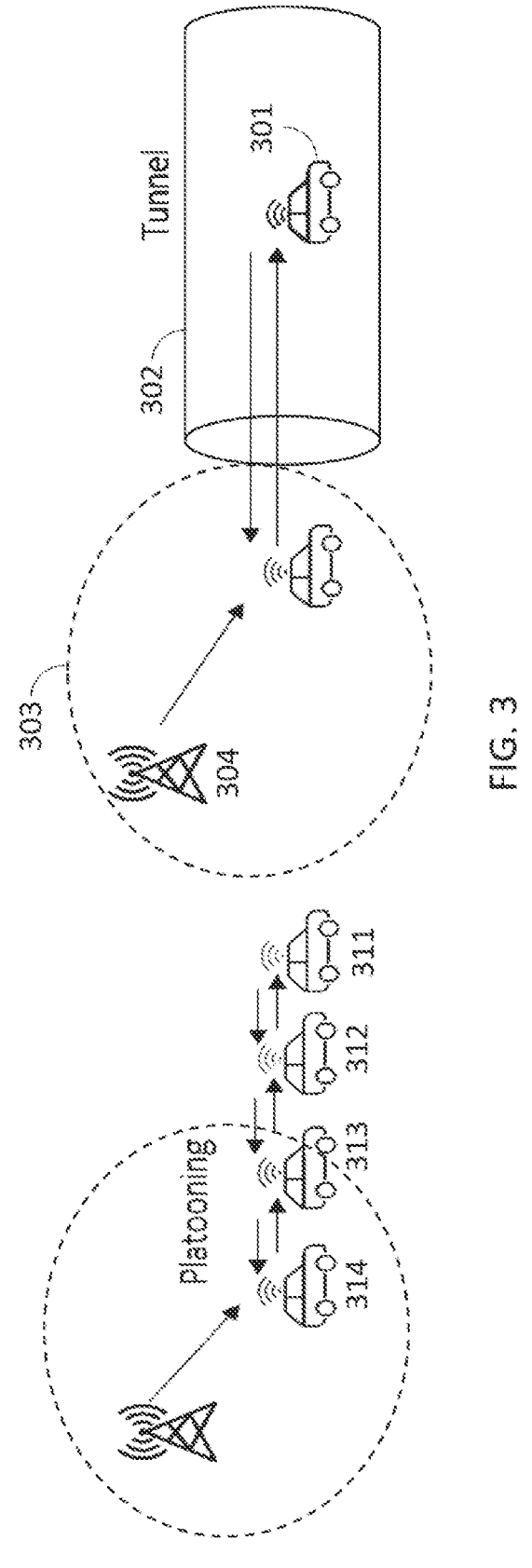
FIG. 3 illustrates out-of-coverage location tracking.

There is a challenge in how to optimally determine the position of a target UE, which is out of coverage. UL/DL-based positioning in NR Release 16 provides a position estimation mechanism for user devices which are in coverage, but not for user devices that are out of coverage. Therefore, based on the dynamicity of the environment and positioning requirements, it may be beneficial to explore solutions for the use cases where the user devices move out of coverage, or have poor quality of coverage. For instance, in some scenarios such as tunnels, parking decks, urban canyon, dense urban scenarios, a user device may move out-of-coverage and cannot be located using GNSS. In particular, the current positioning procedures may have the following limitations:

i) Out-of-coverage user devices may be in RRC_IDLE state and performing cell search procedures. The radio access network may not have the UE Context available, and these user devices cannot be reached by normal paging nor signaling (e.g., RRC) procedures to start the positioning procedure. Therefore, the assumption cannot be met that the user device is in CM-connected state (i.e., RRC_CONNECTED or RRC_INACTIVE) before beginning the positioning procedure (CM is an abbreviation for connection management).

ii) The LMF is not aware of the SL resource pool, mode configuration and resource allocation related information of the user devices.

iii) In cases where user devices with SL capability are moving in the network, there is a possibility that one or more user devices may get out of coverage (e.g., user devices moving in platoon, or user devices moving inside a tunnel as shown in FIG. 3). In such cases, in order to track an out-of-coverage user device, the LMF needs to coordinate with the access and mobility management function (AMF) via paging. The paging may be costly in terms of resources and signaling overhead.

FIG. 3 illustrates out-of-coverage location tracking, where a user device 301 is inside a tunnel 302 and thus out-of-coverage of the radio cell 303 provided by the radio access node 304.

Platooning means a set of vehicles 311, 312, 313, 314 moving together in a train-like manner. Platooning enables the vehicles to dynamically form a platoon travelling together. The vehicles in the platoon may obtain information from the leading vehicle 311 to manage this platoon. This information may allow the vehicles to drive closer than normal in a coordinated manner, going to the same direction and travelling together.

In scenarios where the mobility of a user device is of concern, unnecessary signaling even before the actual positioning session establishment may lead to resource wastage. The local LMF in the next generation radio access network (NG-RAN), the location management component (LMC), is an internal function of the NG-RAN node (e.g., gNB). The interface between the LMC and the serving NG-RAN node is internal, and therefore minimizes the latency between the LMC and serving NG-RAN node.

Some example embodiments may provide a solution to estimate the position of user devices having SL capability in partial and out-of-coverage conditions by exploiting the information centrally available at the network. For example, the network (e.g., LMF) may collect, store and update location and mobility information of the user devices (e.g., absolute/relative position, speed, direction, etc.), as well as RRC status, and this information may be associated with a time stamp. Similarly, the radio access network may acquire information of the cell-specific user device, user devices in coverage, sidelink-related information of user devices, history of RRC status, last connected cell, and/or nearby user devices.

In some example embodiments, the network (e.g., LMF) may collect SL-related information about user devices that are potentially neighboring the target user device (given coarse locations and past location history of user devices) from the corresponding serving gNBs. In turn, this centrally available information may be used to:

i) Determine SL positioning configurations (e.g., time/frequency resources for SL PRS) for the target user device and neighboring user device(s) for positioning the target user device.

ii) Assist neighboring user device(s) to coordinate and select SL resources for positioning—in case no explicit configuration is determined as in (i), or the user devices are operating in SL resource allocation mode 2.

The above information may accordingly be transmitted by the network to the neighboring user device(s), as well as to the target user device by relaying the information via the neighboring user device(s).

Thus, some example embodiments may enable positioning user devices that are out of network coverage, or not connected to the network, or in RRC_IDLE or RRC_INACTIVE state. Furthermore, some example embodiments may help to avoid unnecessary UL/DL PRS or SL PRS transmissions, as well as improve the power efficiency and resource utilization efficiency for positioning.

Some example embodiments may also reduce latency and signaling overhead for positioning out-of-coverage user devices by removing the necessity of accessing the core network components (e.g., AMF). Involvement of the AMF may require signaling between the AMF and LMF and other network elements to discover the user devices, which adds latency and signaling overhead. The AMF may initiate the user device discovery using the paging procedure, which requires to search the user device over one or more cells or tracking area level.

For example, some example embodiments may be used in emergency use cases, where at least one user device goes out of coverage, but stills needs to be positioned (e.g., in natural disasters or in rescue team communications). As another use case example, some example embodiments may be used, when platooning vehicles are, for example, entering a tunnel or an area where the network and/or GNSS are not available for the whole platoon.

Some example embodiments may be applicable to both UE-based and UE-assisted positioning techniques. In case of the UE-based technique, the target user device itself estimates the position of the target user device, and reports the location estimate to the network (e.g., LMF) via neighboring user device(s) that are in coverage. In case of UE-assisted positioning, the position of the target user device may be estimated at the LMF.

Some example embodiments are described below using principles and terminology of 5G technology without limiting the example embodiments to 5G communication systems, however.

Figure 4:
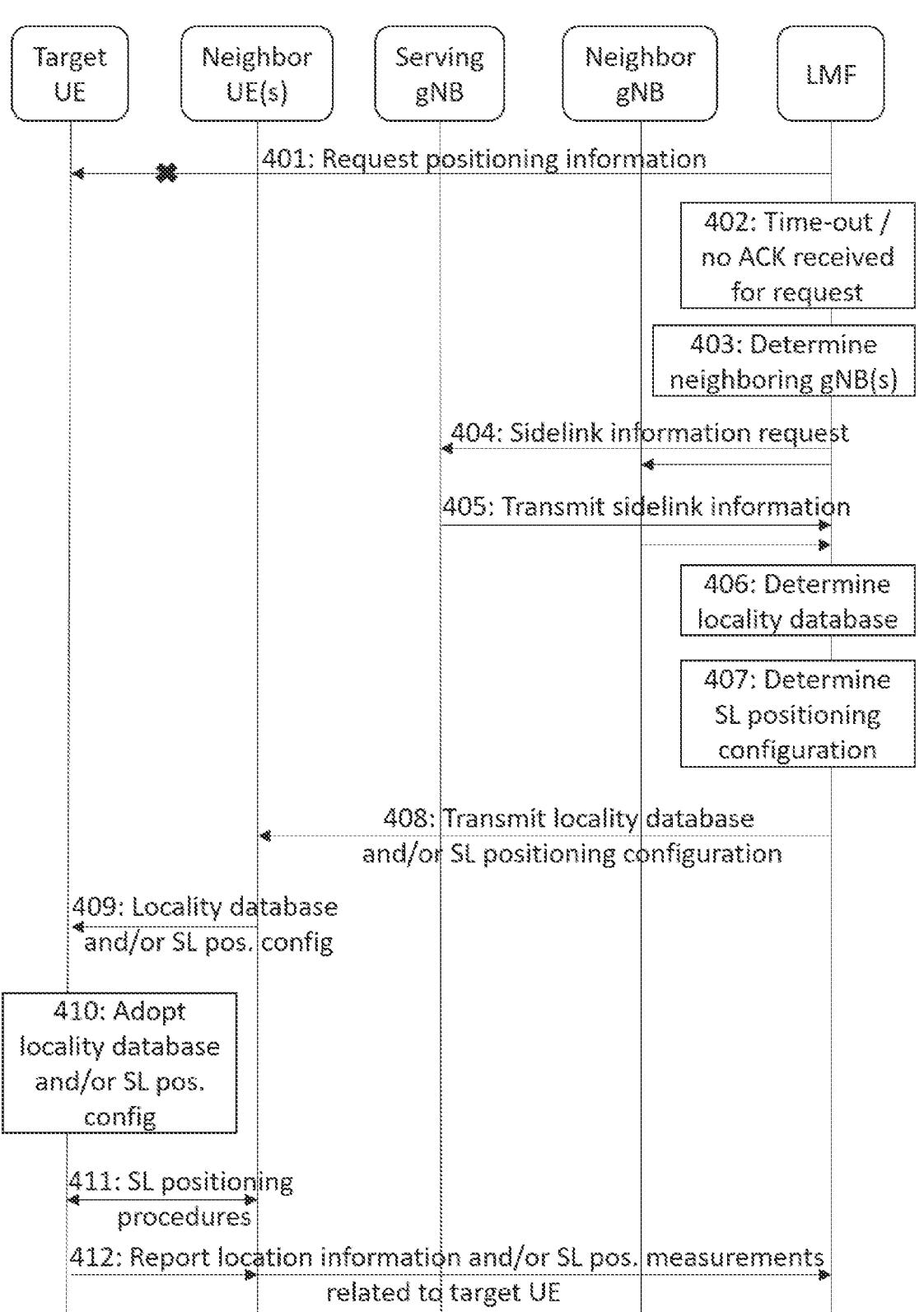
FIG. 4 illustrates a signaling diagram according to an example embodiment.

FIG. 4 illustrates a signaling diagram according to an example embodiment. Initially a group of user devices including a target user device and at least one neighboring user device are in coverage or partial coverage of a radio cell. Later, the target user device moves out of the coverage, but the at least one neighboring user device is still in coverage of the radio cell.

Referring to FIG. 4, in block 401, a positioning entity such as an LMF may transmit a request for positioning information to the target user device for example via the LTE positioning protocol (LPP), while the target user device is out of coverage. The positioning request may be used by the LMF to trigger a positioning procedure to estimate the position of the target user device. However, the target user device is out of network coverage, and thus the target user device does not receive the request for the positioning information.

In block 402, since the target user device is out of coverage, the positioning request is timed out or unacknowledged, which terminates the positioning session.

In block 403, the LMF may determine one or more neighboring radio access nodes (e.g., gNBs or TRPs) of the (last) serving radio access node (e.g., gNB or TRP) of the target user device based on available location information of the target user device and at least one neighboring user device of the target user device.

Herein the term "neighboring user device" may refer to a user device that is in sidelink coverage range of the target user device, i.e., able to communicate with the target user device via sidelink communication. The at least one neighboring user device may be served by the same or different radio access node than the target user device.

The available location information may comprise, for example, at least a range in a radio access network, coarse location information, and/or historical location information of the target user device and the at least one neighboring user device. For example, the available location information may comprise absolute or relative positions, speed, direction, etc., of the target user device and the at least one neighboring user device.

In block 404, the LMF may transmit a sidelink information request to the (last) serving radio access node and the one or more neighboring radio access nodes for example via the new radio positioning protocol A (NRPPa), wherein the sidelink information request indicates requesting sidelink information of the target user device and the at least one neighboring user device of the target user device.

In block 405, the (last) serving radio access node and the one or more neighboring radio access nodes may transmit the sidelink information to the LMF for example via NRPPa in response to the sidelink information request.

The sidelink information may comprise, for example, at least one of: sidelink resource allocation information of the target user device and the at least one neighboring user device, and/or sidelink channel condition information between the target user device and the at least one neighboring user device. For example, the sidelink information of the target user device may comprise NR SL mode 2 resource pool information. The sidelink channel condition information may comprise, for example, at least one of: sidelink signal-to-interference-plus-noise ratio (SL SINR), reference signal received power (RSRP), channel state information (CSI), line-of-sight (LOS), non-line-of-sight (NLOS), path loss, channel busy ratio, etc.

In block 406, the LMF may determine, or construct, a locality database based at least on the sidelink information and/or the available location information.

The locality database may be a set or collection of time-stamped information collected by the LMF or radio access node(s), and it may be provided to the at least one neighboring user device and/or the target user device. The locality database may be used by the at least one neighboring user device to reach the target user device, and/or by the target user device to reach the at least one neighbouring user device within reachable distance, when the target user device is notable to reach the network (e.g., gNB). The locality database may also be referred to as assistance data for positioning.

The locality database may comprise information on at least one of: an effective distance between one or more pairs of user devices comprising at least the target user device and the at least one neighboring user device (e.g., locality matrix $M_{(ij)}{}^t$ for pair of user devices $UE_i$ and $UE_j$), an adjacency indication of the one or more pairs of user devices, a sidelink resource allocation mode $Mode_{index}$ (e.g., NR SL mode 1 or NR SL mode 2) of the target user device and the at least one neighboring user device, one or more sidelink resource pools allocated to the target user device and the at least one neighboring user device, sidelink time and/or frequency resources $RBL_{ij}$ allocated to the target user device and the at least one neighboring user device, and/or one or more sidelink channel conditions between the target user device and the at least one neighboring user device.

The locality database may further comprise an associated time stamp (e.g., time t) and/or a validity indication of the information comprised in the locality database. The validity indication may indicate that the information is valid.

The effective distance may be defined as the distance with respect to the permitted transmit power of a given user device.

The adjacency indication may indicate whether or not a pair of user devices $UE_i$ and $UE_j$ are within a maximum coverage range $d_{Max}$ from each other, such that:

$$M_{(ij)}^t = \begin{cases} 1, & \text{if distance } (UE_i, UE_j) < d_{Max} \\ 0, & \text{otherwise} \end{cases}$$

The one or more sidelink channel conditions may comprise, for example, at least one of: sidelink signal-to-interference-plus-noise ratio (SL SINR), reference signal received power (RSRP), channel state information (CSI), line-of-sight (LOS), non-line-of-sight (NLOS), path loss $PL_{ij}$, channel busy ratio, etc.

An example of the locality matrix $M_{(ij)}{}^t$ between user devices is shown in Table 1 below, where $UE_2$ denotes the target user device.

TABLE 1

| | | Example of locality matrix | | |
|---|---|---|---|---|
| | UE1 | UE2 | UE3 | UE4 |
| UE1 | 0, $PL_{ij}$, $RB_{ij}$, $Mode_{index}$ | 1, . . . | 0, . . . | 0, . . . |

TABLE 1-continued

| | | Example of locality matrix | | |
|---|---|---|---|---|
| | UE1 | UE2 | UE3 | UE4 |
| UE2 | 1, . . . | 0, . . . | 1, . . . | 1, . . . |
| UE3 | 0, . . . | 1, . . . | 0, . . . | 0, . . . |
| UE4 | 0, . . . | 1, . . . | 0, . . . | 0, . . . |

In block 407, the LMF may determine, based at least on the locality database, a sidelink positioning configuration for positioning the target user device. The sidelink positioning configuration may comprise, for example, the time and/or frequency resource allocation for transmission and/or reception of SL PRS, at least for user device(s) in coverage or using NR SL mode 1 resource allocation.

The sidelink positioning configuration may depend on the resource allocation mode of the user devices. While the at least one neighboring user device (in-coverage or partial coverage) may use NR SL mode 1 or NR SL mode 2, the target user device (out-of-coverage) may be limited to NR SL mode 2. For NR SL mode 1 user devices, the network (e.g., LMF) may determine specific time and/or frequency resources to transmit SL PRS. For NR SL mode 2 user devices, the network (e.g., LMF) may provide the locality database to help them do more efficient resource selections.

In block 408, the LMF may transmit at least a part of the locality database and/or the sidelink positioning configuration to the at least one neighboring user device of the target user device for example via LPP. The LMF may optimize the information to be shared (e.g., full information, partial information, compressed, etc.), as well as the selection of neighboring user device(s) to reduce signaling overhead.

The LMF may select all neighboring user devices or a subset of the neighboring user devices to assist the out-of-coverage target user device for SL positioning. For instance, the selection of the neighboring user device(s) may be based on whether the neighboring user device(s) have a known location, or depending on the radio L1 parameters between the user devices. The LMF may collect the latter information from the corresponding serving gNB(s).

In block 409, the at least one neighboring user device may transmit, or forward, the at least part of the locality database and/or the sidelink positioning configuration to the target user device via sidelink.

In block 410, the target user device may adopt, or apply, the at least part of the locality database and/or the sidelink positioning configuration.

In block 411, the target user device and the at least one neighboring user device may perform sidelink positioning procedures based on the at least part of the locality database and/or the sidelink positioning configuration. User devices doing autonomous resource allocation for SL positioning (i.e., NR SL mode 2 user devices) may utilize the locality database and/or SL positioning configuration information for selecting the resources for their SL PRS. For example, the target user device may transmit one or more sidelink positioning reference signals to the at least one neighboring user device, and/or the at least one neighboring user device may transmit one or more sidelink positioning reference signals to the target user device.

In block 412, the target user device may report, to the at least one neighboring user device via sidelink, location information and/or sidelink positioning measurements related to the target user device. The at least one neighboring user device may then report or forward the location information and/or the sidelink positioning measurements to the LMF for example via LPP. Alternatively, or additionally, the at least one neighbor user device may report, to the LMF via LPP, positioning measurements that the at least one neighboring user device collected by measuring one or more signals received from the target user device.

Figure 5:
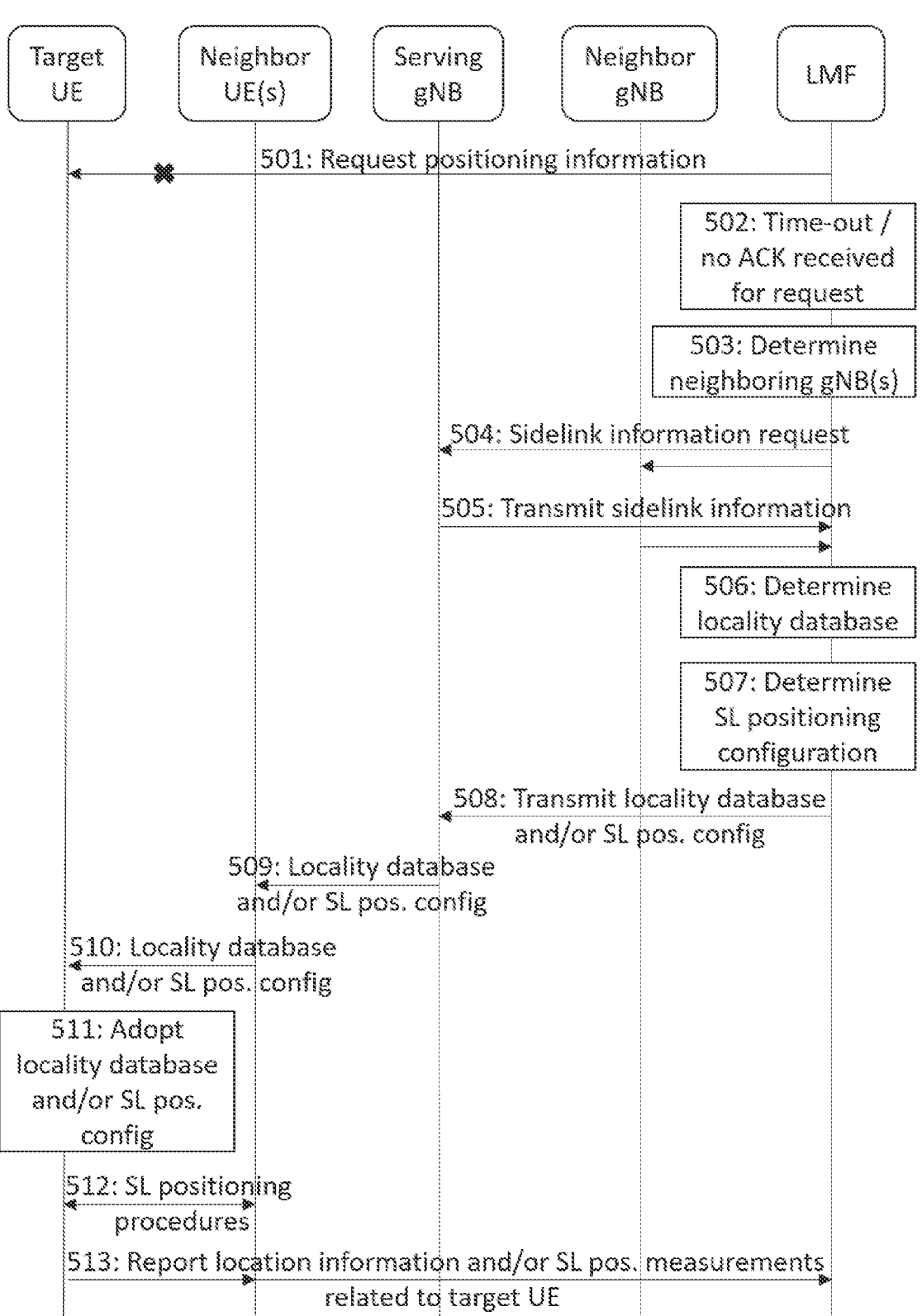
FIG. 5 illustrates a signaling diagram according to an example embodiment.

FIG. 5 illustrates a signaling diagram according to another example embodiment.

Referring to FIG. 5, in block 501, a positioning entity such as an LMF may transmit a request for positioning information to the target user device for example via LPP, while the target user device is out of coverage. The positioning request may be used by the LMF to trigger a positioning procedure to estimate the position of the target user device. However, the target user device is out of network coverage, and thus the target user device does not receive the request for the positioning information.

In block 502, since the target user device is out of coverage, the positioning request is timed out or unacknowledged, which terminates the positioning session.

In block 503, the LMF may determine one or more neighboring radio access nodes (e.g., gNBs or TRPs) of the (last) serving radio access node (e.g., gNB or TRP) of the target user device based on available location information of the target user device and at least one neighboring user device of the target user device.

The available location information may comprise, for example, at least a range in a radio access network, coarse location information, and/or historical location information of the target user device and the at least one neighboring user device. For example, the available location information may comprise absolute or relative positions, speed, direction, etc., of the target user device and the at least one neighboring user device.

In block 504, the LMF may transmit a sidelink information request to the (last) serving radio access node and the one or more neighboring radio access nodes for example via NRPPa, wherein the sidelink information request indicates requesting sidelink information of the target user device and the at least one neighboring user device of the target user device.

In block 505, the (last) serving radio access node and the one or more neighboring radio access nodes may transmit the sidelink information to the LMF for example via NRPPa in response to the sidelink information request.

The sidelink information may comprise, for example, at least one of: sidelink resource allocation information of the target user device and the at least one neighboring user device, and/or sidelink channel condition information between the target user device and the at least one neighboring user device. For example, the sidelink information of the target user device may comprise NR SL mode 2 resource pool information. The sidelink channel condition information may comprise, for example, at least one of: SL SINR, RSRP, CSI, LOS, NLOS, path loss, channel busy ratio, etc.

In block 506, the LMF may determine, or construct, a locality database based at least on the sidelink information and/or the available location information.

The locality database may comprise information on at least one of: an effective distance between one or more pairs of user devices comprising at least the target user device and the at least one neighboring user device, an adjacency indication of the one or more pairs of user devices, a sidelink resource allocation mode (e.g., NR SL mode 1 or NR SL mode 2) of the target user device and the at least one neighboring user device, one or more sidelink resource pools allocated to the target user device and the at least one neighboring user device, sidelink time and/or frequency resources allocated to the target user device and the at least one neighboring user device, and/or one or more sidelink channel conditions between the target user device and the at least one neighboring user device.

The locality database may further comprise an associated time stamp (e.g., time t) and/or a validity indication of the information comprised in the locality database. The validity indication may indicate that the information is valid.

The one or more sidelink channel conditions may comprise, for example, at least one of: SL SINR, RSRP, CSI, LOS, NLOS, path loss, channel busy ratio, etc.

In block 507, the LMF may determine, based at least on the locality database, a sidelink positioning configuration for positioning the target user device. The sidelink positioning configuration may comprise, for example, the time and/or frequency resource allocation for transmission and/or reception of SL PRS, at least for user device(s) in coverage or using NR SL mode 1 resource allocation.

The sidelink positioning configuration may depend on the resource allocation mode of the user devices. While the at least one neighboring user device (in-coverage or partial coverage) may use NR SL mode 1 or NR SL mode 2, the target user device (out-of-coverage) may be limited to NR SL mode 2. For NR SL mode 1 user devices, the network (e.g., LMF) may determine specific time and/or frequency resources to transmit SL PRS. For NR SL mode 2 user devices, the network (e.g., LMF) may provide the locality database to help them do more efficient resource selections.

In block 508, the LMF may transmit, for example via NRPPa, at least a part of the locality database and/or the sidelink positioning configuration to one or more radio access nodes serving the at least one neighboring user device. The LMF may optimize the information to be shared (e.g., full information, partial information, compressed, etc.).

In block 509, the one or more radio access nodes may transmit, or share, the at least part of the locality database and/or the sidelink positioning configuration to the at least one neighboring user device for example via DL RRC broadcast or unicast.

In block 510 the at least one neighboring user device may transmit, or forward, the at least part of the locality database and/or the sidelink positioning configuration to the target user device via sidelink.

In block 511, the target user device may adopt, or apply, the at least part of the locality database and/or the sidelink positioning configuration.

In block 512, the target user device and the at least one neighboring user device may perform sidelink positioning procedures based on the at least part of the locality database and/or the sidelink positioning configuration. User devices doing autonomous resource allocation for SL positioning (i.e., NR SL mode 2 user devices) may utilize the locality database and/or SL positioning configuration information for selecting the resources for their SL PRS. For example, the target user device may transmit one or more sidelink positioning reference signals to the at least one neighboring user device, and/or the at least one neighboring user device may transmit one or more sidelink positioning reference signals to the target user device.

In block 513, the target user device may report, to the at least one neighboring user device via sidelink, location information and/or sidelink positioning measurements related to the target user device. The at least one neighboring user device may then report or forward the location information and/or the sidelink positioning measurements to the LMF for example via LPP. Alternatively, or additionally, the at least one neighbor user device may report, to the LMF via LPP, positioning measurements that the at least one neighboring user device collected by measuring one or more signals received from the target user device.

Figure 6:
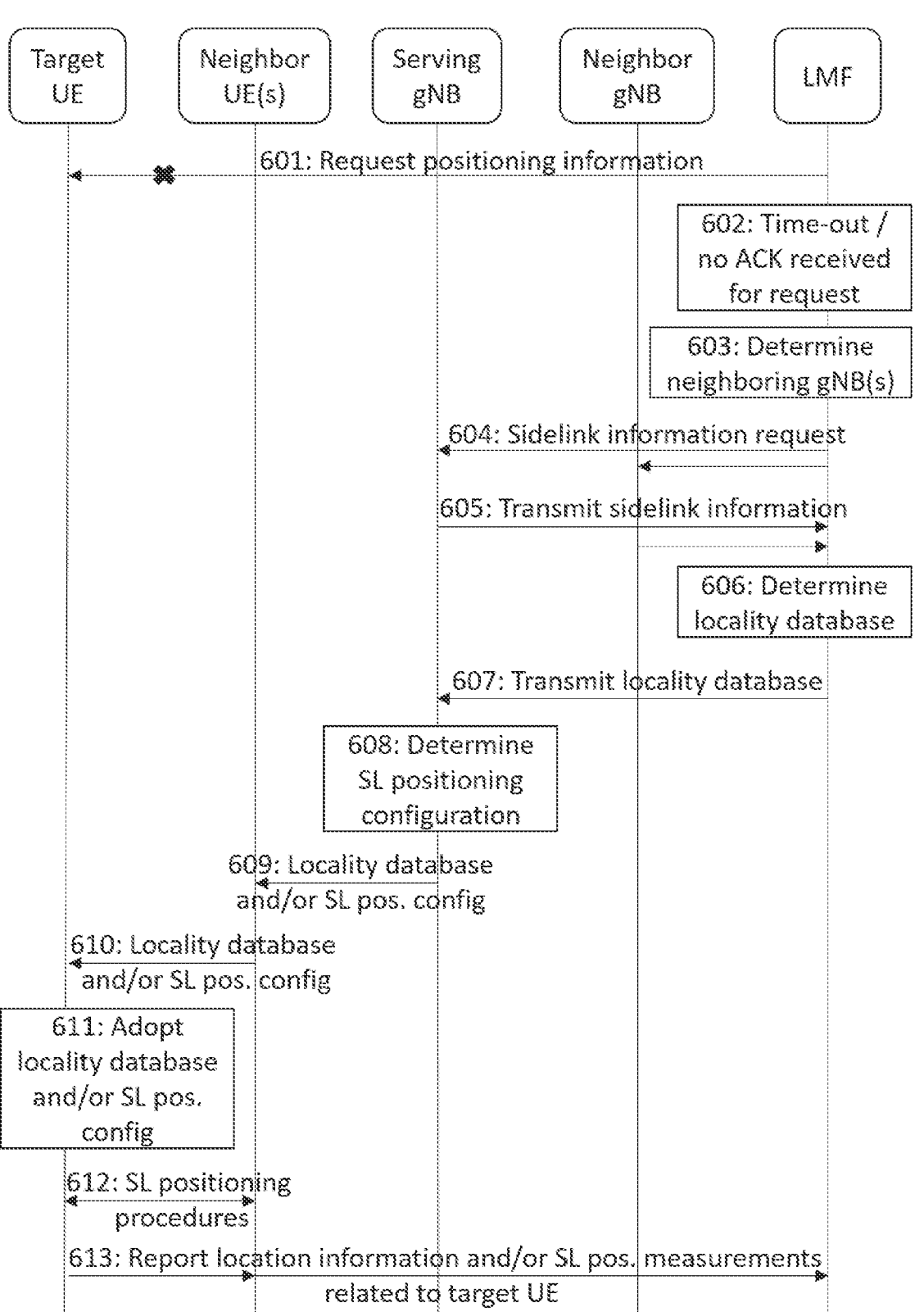
FIG. 6 illustrates a signaling diagram according to an example embodiment.

FIG. 6 illustrates a signaling diagram according to another example embodiment.

Referring to FIG. 6, in block 601, a positioning entity such as an LMF may transmit a request for positioning information to the target user device for example via LPP, while the target user device is out of coverage. The positioning request may be used by the LMF to trigger a positioning procedure to estimate the position of the target user device. However, the target user device is out of network coverage, and thus the target user device does not receive the request for the positioning information.

In block 602, since the target user device is out of coverage, the positioning request is timed out or unacknowledged, which terminates the positioning session.

In block 603, the LMF may determine one or more neighboring radio access nodes (e.g., gNBs or TRPs) of the (last) serving radio access node (e.g., gNB or TRP) of the target user device based on available location information of the target user device and at least one neighboring user device of the target user device.

The available location information may comprise, for example, at least a range in a radio access network, coarse location information, and/or historical location information of the target user device and the at least one neighboring user device. For example, the available location information may comprise absolute or relative positions, speed, direction, etc., of the target user device and the at least one neighboring user device.

In block 604, the LMF may transmit a sidelink information request to the (last) serving radio access node and the one or more neighboring radio access nodes for example via NRPPa, wherein the sidelink information request indicates requesting sidelink information of the target user device and the at least one neighboring user device of the target user device.

In block 605, the (last) serving radio access node and the one or more neighboring radio access nodes may transmit the sidelink information to the LMF for example via NRPPa in response to the sidelink information request.

The sidelink information may comprise, for example, at least one of: sidelink resource allocation information of the target user device and the at least one neighboring user device, and/or sidelink channel condition information between the target user device and the at least one neighboring user device. For example, the sidelink information of the target user device may comprise NR SL mode 2 resource pool information. The sidelink channel condition information may comprise, for example, at least one of: SL SINR, RSRP, CSI, LOS, NLOS, path loss, channel busy ratio, etc.

In block 606, the LMF may determine, or construct, a locality database based at least on the sidelink information and/or the available location information.

The locality database may comprise information on at least one of: an effective distance between one or more pairs of user devices comprising at least the target user device and the at least one neighboring user device, an adjacency indication of the one or more pairs of user devices, a sidelink resource allocation mode (e.g., NR SL mode 1 or NR SL mode 2) of the target user device and the at least one neighboring user device, one or more sidelink resource pools allocated to the target user device and the at least one neighboring user device, sidelink time and/or frequency resources allocated to the target user device and the at least one neighboring user device, and/or one or more sidelink channel conditions between the target user device and the at least one neighboring user device.

The locality database may further comprise an associated time stamp (e.g., time t) and/or a validity indication of the information comprised in the locality database. The validity indication may indicate that the information is valid.

The one or more sidelink channel conditions may comprise, for example, at least one of: SL SINR, RSRP, CSI, LOS, NLOS, path loss, channel busy ratio, etc.

In block 607, the LMF may transmit, for example via NRPPa, at least a part of the locality database to one or more radio access nodes serving the at least one neighboring user device. The LMF may optimize the information to be shared (e.g., full information, partial information, compressed, etc.).

In block 608, the one or more radio access nodes may determine, based at least on the locality database, a sidelink positioning configuration for positioning the target user device. The sidelink positioning configuration may comprise, for example, the time and/or frequency resource allocation for transmission and/or reception of SL PRS, at least for user device(s) in coverage or using NR SL mode 1 resource allocation.

The sidelink positioning configuration may depend on the resource allocation mode of the user devices. While the at least one neighboring user device (in-coverage or partial coverage) may use NR SL mode 1 or NR SL mode 2, the target user device (out-of-coverage) may be limited to NR SL mode 2. For NR SL mode 1 user devices, the network (e.g., gNB) may determine specific time and/or frequency resources to transmit SL PRS. For NR SL mode 2 user devices, the network (e.g., gNB) may provide the locality database to help them do more efficient resource selections.

In block 609, the one or more radio access nodes may transmit, or share, the at least part of the locality database and/or the sidelink positioning configuration to the at least one neighboring user device for example via DL RRC broadcast or unicast.

In block 610 the at least one neighboring user device may transmit, or forward, the at least part of the locality database and/or the sidelink positioning configuration to the target user device via sidelink.

In block 611, the target user device may adopt, or apply, the at least part of the locality database and/or the sidelink positioning configuration.

In block 612, the target user device and the at least one neighboring user device may perform sidelink positioning procedures based on the at least part of the locality database and/or the sidelink positioning configuration. User devices doing autonomous resource allocation for SL positioning (i.e., NR SL mode 2 user devices) may utilize the locality database and/or SL positioning configuration information for selecting the resources for their SL PRS. For example, the target user device may transmit one or more sidelink positioning reference signals to the at least one neighboring user device, and/or the at least one neighboring user device may transmit one or more sidelink positioning reference signals to the target user device.

In block 613, the target user device may report, to the at least one neighboring user device via sidelink, location information and/or sidelink positioning measurements related to the target user device. The at least one neighboring user device may then report or forward the location information and/or the sidelink positioning measurements to the LMF for example via LPP. Alternatively, or additionally, the at least one neighbor user device may report, to the LMF via LPP, positioning measurements that the at least one neighboring user device collected by measuring one or more signals received from the target user device.

FIG. 7 illustrates a flow chart according to an example embodiment of a method performed by an apparatus such as, or comprising, or comprised in, a positioning entity suitable for positioning user devices. The positioning entity may also be referred to as a location server or a location management function (LMF).

Referring to FIG. 7, in block 701, one or more radio access nodes are determined based on available location information of a target user device and at least one neighboring user device of the target user device. The target user device may be out of coverage of the radio access network.

In block 702, a sidelink information request is transmitted to the one or more radio access nodes, wherein the sidelink information request indicates requesting sidelink information of the target user device and the at least one neighboring user device of the target user device.

In block 703, the sidelink information is received from the one or more radio access nodes.

In block 704, at least a part of a locality database and/or a sidelink positioning configuration for positioning the target user device is transmitted to at least one of the one or more radio access nodes and/or the at least one neighboring user device, wherein the locality database and/or the sidelink positioning configuration are based at least on the sidelink information.

FIG. 8 illustrates a flow chart according to an example embodiment of a method performed by an apparatus such as, or comprising, or comprised in, a radio access node.

Referring to FIG. 8, in block 801, a sidelink information request is received from a positioning entity, wherein the sidelink information request indicates requesting sidelink information of a target user device and at least one neighboring user device of the target user device. The positioning entity may also be referred to as a location server or a location management function (LMF).

In block 802, the sidelink information is transmitted to the positioning entity.

In block 803, at least a part of a locality database and/or a sidelink positioning configuration for positioning the target user device is received from the positioning entity, wherein the locality database and/or the sidelink positioning configuration are based at least on the sidelink information.

In block 804, the at least part of the locality database and/or the sidelink positioning configuration is transmitted to the at least one neighboring user device.

The blocks, related functions, and information exchanges (messages) described above by means of FIGS. 4-8 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 9:
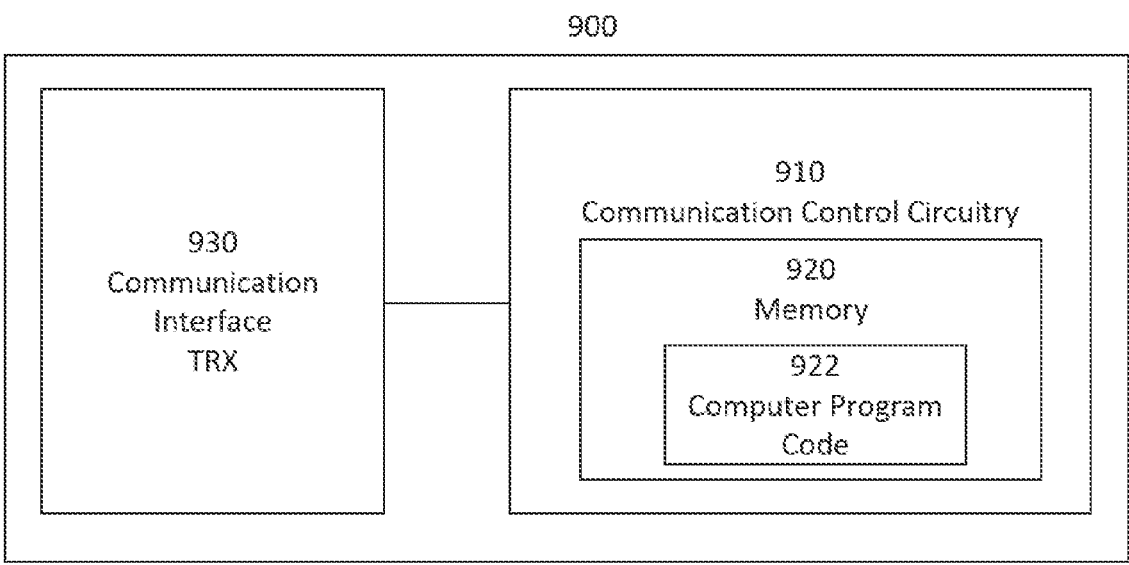
FIG. 9 illustrates an example embodiment of an apparatus.

FIG. 9 illustrates an example embodiment of an apparatus 900, which may be an apparatus such as, or comprising, or comprised in, a positioning entity suitable for positioning user devices. The positioning entity may also be referred to as a location server or a location management function (LMF).

The apparatus 900 may comprise, for example, a circuitry or a chipset applicable for realizing one or more of the example embodiments described above. The apparatus 900 may be an electronic device comprising one or more electronic circuitries. The apparatus 900 may comprise a communication control circuitry 910 such as at least one processor, and at least one memory 920 storing instructions which, when executed by the at least one processor, cause the apparatus 900 to carry out one or more of the example embodiments described above. Such instructions may, for example, include a computer program code (software) 922 wherein the at least one memory and the computer program code (software) 922 are configured, with the at least one processor, to cause the apparatus 900 to carry out some of the example embodiments described above. Herein computer program code may in turn refer to instructions that cause the apparatus 900 to perform one or more of the example embodiments described above. That is, the at least one processor and the at least one memory 920 storing the instructions may cause said performance of the apparatus.

The processor is coupled to the memory 920. The processor is configured to read and write data to and from the memory 920. The memory 920 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 920 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 900 may further comprise a communication interface 930 comprising hardware and/or software for realizing communication connectivity according to one or more wired and/or wireless communication protocols. The communication interface 930 comprises at least one transceiver (TRX) that may be integrated to the apparatus 900 or that the apparatus 900 may be connected to. The communication interface 930 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 930 may provide the apparatus with radio communication capabilities to communicate in the cellular communication system. The communication interface may, for example, provide a radio interface to one or more user devices and/or one or more radio access nodes. Alternatively, or additionally, the apparatus 900 may comprise a communication interface towards a core network entity such as an access and mobility management function (AMF), through which the apparatus 900 may communicate with the one or more user devices and/or the one or more radio access nodes.

It is to be noted that the apparatus 900 may further comprise various components not illustrated in FIG. 9. The various components may be hardware components and/or software components.

Figure 10:
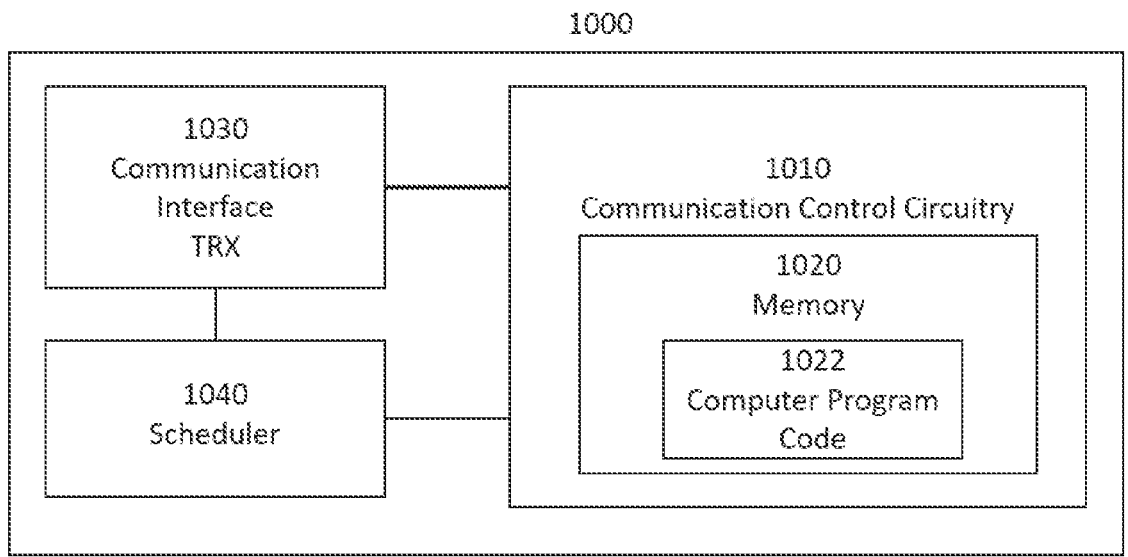
FIG. 10 illustrates an example embodiment of an apparatus.

The apparatus 1000 of FIG. 10 illustrates an example embodiment of an apparatus such as, or comprising, or comprised in, a radio access node. The radio access node may also be referred to, for example, as a network node, a radio access network (RAN) node, a next generation radio access network (NG-RAN) node, a NodeB, an eNB, a gNB, a base transceiver station (BTS), a base station, an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission-and-reception point (TRP).

The apparatus 1000 may comprise, for example, a circuitry or a chipset applicable for realizing one or more of the example embodiments described above. The apparatus 1000 may be an electronic device comprising one or more electronic circuitries. The apparatus 1000 may comprise a communication control circuitry 1010 such as at least one processor, and at least one memory 1020 storing instructions which, when executed by the at least one processor, cause the apparatus 1000 to carry out one or more of the example embodiments described above. Such instructions may, for example, include a computer program code (software) 1022 wherein the at least one memory and the computer program code (software) 1022 are configured, with the at least one processor, to cause the apparatus 1000 to carry out some of the example embodiments described above. Herein computer program code may in turn refer to instructions that cause the apparatus 1000 to perform one or more of the example embodiments described above. That is, the at least one processor and the at least one memory 1020 storing the instructions may cause said performance of the apparatus.

The processor is coupled to the memory 1020. The processor is configured to read and write data to and from the memory 1020. The memory 1020 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage.

In general, memories may be referred to as non-transitory computer readable media. The memory 1020 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

The memory 1020 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1000 may further comprise a communication interface 1030 comprising hardware and/or software for realizing communication connectivity according to one or more communication protocols. The communication interface 1030 comprises at least one transceiver (TRX) that may be integrated to the apparatus 1000 or that the apparatus 1000 may be connected to. The communication interface 1030 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1030 provides the apparatus with radio communication capabilities to communicate in the cellular communication system. The communication interface may, for example, provide a radio interface to one or more user devices. The apparatus 1000 may further comprise another interface towards a core network such as the network coordinator apparatus and/or to the access nodes of the cellular communication system.

The apparatus 1000 may further comprise a scheduler 1040 that is configured to allocate radio resources. The scheduler 1040 may be configured along with the communication control circuitry 1010 or it may be separately configured.

It is to be noted that the apparatus 1000 may further comprise various components not illustrated in FIG. 10. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus comprising at least one processor and at least one transceiver, wherein the at least one processor is configured to:
   determine one or more radio access nodes based on available location information of a target user device and at least one neighboring user device of the target user device, wherein the target user device is out of coverage;
   wherein the at least one transceiver is configured to:
   transmit a sidelink information request to the one or more radio access nodes, wherein the sidelink information request indicates requesting sidelink information of the target user device and the at least one neighboring user device of the target user device;
   receive the sidelink information from the one or more radio access nodes;

transmit, to at least the one or more radio access nodes and the at least one neighboring user device, at least a part of a locality database and a sidelink positioning configuration for positioning the target user device, wherein the locality database and the sidelink positioning configuration are based at least on the sidelink information,
   wherein the locality database comprises information on at least: an effective distance between one or more pairs of user devices comprising at least the target user device and the at least one neighboring user device, an adjacency indication of the one or more pairs of user devices, a sidelink resource allocation mode of the target user device and the at least one neighboring user device, one or more sidelink resource pools allocated to the target user device and the at least one neighboring user device, sidelink time and frequency resources allocated to the target user device and the at least one neighboring user device, and one or more sidelink channel conditions between the target user device and the at least one neighboring user device, and
   receive, from the at least one neighboring user device, location information and sidelink positioning measurements related to the target user device.

2. The apparatus according to claim 1, wherein the at least one processor is further configured to:
   determine the locality database based at least on the sidelink information and the available location information.

3. The apparatus according to claim 1, wherein the at least one processor is further configured to:
   determine the sidelink positioning configuration based at least on the locality database.

4. The apparatus according to claim 1, wherein the sidelink information request is transmitted, via the new radio positioning protocol A (NRPPa), to a last serving radio access node and one or more neighboring radio access nodes, and the sidelink information is received from the last serving radio access node and the one or more neighboring radio access nodes in response to the sidelink information request.

5. The apparatus according to claim 1, wherein the locality database further comprises an associated time stamp and a validity indication of the information comprised in the locality database.

6. The apparatus according to claim 1, wherein the sidelink information comprises at least one of: sidelink resource allocation information of the target user device and the at least one neighboring user device, and sidelink channel condition information between the target user device and the at least one neighboring user device.

7. The apparatus according to claim 1, wherein the sidelink positioning configuration depends on resource allocation modes of the user devices, the target user device being limited to NR sidelink mode 2 and the at least one neighboring user device using NR sidelink mode 1 or NR sidelink mode 2.

8. The apparatus according to claim 1, wherein transmitting the at least part of the locality database and the sidelink positioning configuration to the at least one neighboring user device causes the at least one neighboring user device to forward the at least part of the locality database and the sidelink positioning configuration to the target user device.

9. The apparatus according to claim 1, wherein the available location information comprises at least a range in a radio access network and historical location information of the target user device and the least one neighboring user device.

10. An apparatus comprising at least one transceiver, wherein the at least one transceiver is configured to:

receive a sidelink information request from a positioning entity, wherein the sidelink information request indicates requesting sidelink information of a target user device and at least one neighboring user device of the target user device, wherein the target user device is out of coverage;

transmit the sidelink information to the positioning entity;

receive, from the positioning entity, at least a part of a locality database and a sidelink positioning configuration for positioning the target user device, wherein the locality database and the sidelink positioning configuration are based at least on the sidelink information;

transmit, to the at least one neighboring user device, the at least part of the locality database and the sidelink positioning configuration, wherein the locality database comprises information on at least one of: an effective distance between one or more pairs of user devices comprising at least the target user device and the at least one neighboring user device, an adjacency indication of the one or more pairs of user devices, a sidelink resource allocation mode of the target user device and the at least one neighboring user device, one or more sidelink resource pools allocated to the target user device and the at least one neighboring user device, sidelink time and frequency resources allocated to the target user device and the at least one neighboring user device, and one or more sidelink channel conditions between the target user device and the at least one neighboring user device, and receive, from the at least one neighboring user device, location information and sidelink positioning measurements related to the target user device.

11. The apparatus according to claim 10, further comprising at least one processor, wherein the at least one processor is configured to:

determine the sidelink positioning configuration based at least on the locality database.

12. The apparatus according to claim 10, wherein the locality database further comprises an associated time stamp and a validity indication of the information comprised in the locality database.

13. The apparatus according to claim 10, wherein the sidelink information comprises at least one of: sidelink resource allocation information of the target user device and the at least one neighboring user device, and sidelink channel condition information between the target user device and the at least one neighboring user device.

14. A method comprising:

determining one or more radio access nodes based on available location information of a target user device and at least one neighboring user device of the target user device, wherein the target user device is out of coverage;

transmitting a sidelink information request to the one or more radio access nodes, wherein the sidelink information request indicates requesting sidelink information of the target user device and the at least one neighboring user device of the target user device;

receiving the sidelink information from the one or more radio access nodes;

transmitting, to at least the one or more radio access nodes and the at least one neighboring user device, at least a part of a locality database and a sidelink positioning configuration for positioning the target user device, wherein the locality database and the sidelink positioning configuration are based at least on the sidelink information, wherein the locality database comprises information on at least: an effective distance between one or more pairs of user devices comprising at least the target user device and the at least one neighboring user device, an adjacency indication of the one or more pairs of user devices, a sidelink resource allocation mode of the target user device and the at least one neighboring user device, one or more sidelink resource pools allocated to the target user device and the at least one neighboring user device, sidelink time and frequency resources allocated to the target user device and the at least one neighboring user device, and one or more sidelink channel conditions between the target user device and the at least one neighboring user device, and receiving, from the at least one neighboring user device, location information and sidelink positioning measurements related to the target user device.

15. A method comprising:

receiving a sidelink information request from a positioning entity, wherein the sidelink information request indicates requesting sidelink information of a target user device and at least one neighboring user device of the target user device, wherein the target user device is out of coverage;

transmitting the sidelink information to the positioning entity; receiving, from the positioning entity, at least a part of a locality database and a sidelink positioning configuration for positioning the target user device, wherein the locality database and the sidelink positioning configuration are based at least on the sidelink information; and transmitting, to the at least one neighboring user device, the at least part of the locality database and the sidelink positioning configuration, wherein the locality database comprises information on at least one of: an effective distance between one or more pairs of user devices comprising at least the target user device and the at least one neighboring user device, an adjacency indication of the one or more pairs of user devices, a sidelink resource allocation mode of the target user device and the at least one neighboring user device, one or more sidelink resource pools allocated to the target user device and the at least one neighboring user device, sidelink time and frequency resources allocated to the target user device and the at least one neighboring user device, and one or more sidelink channel conditions between the target user device and the at least one neighboring user device, and receiving, from the at least one neighboring user device, location information and sidelink positioning measurements related to the target user device.

16. The method according to claim 15, further comprising updating the locality database when new sidelink positioning measurements or channel condition information are received from the one or more radio access nodes.

17. The method according to claim 15, wherein each entry in the locality database includes validity information, and expired entries are disregarded when determining the sidelink positioning configuration.

18. The method according to claim 15, wherein the available location information comprises historical location information of the target user device and the at least one neighboring user device.

19. The method according to claim 15, further comprising receiving, from the at least one neighboring user device, sidelink positioning measurements relating to the target user device, and storing the received measurements in the locality database.

20. The method according to claim 15, wherein the sidelink positioning configuration is determined for a scenario selected from the group consisting of a vehicular platoon, a public safety scenario, and an underground tunnel scenario.

* * * * *